(12) United States Patent
Allen

(10) Patent No.: US 7,284,942 B1
(45) Date of Patent: Oct. 23, 2007

(54) MOTORCYCLE SLIDER

(76) Inventor: Keith Allen, 431 Lynn St., Oviedo, FL (US) 32765

( * ) Notice: Subject to any disclaimer, the term of this patent is extended or adjusted under 35 U.S.C. 154(b) by 349 days.

(21) Appl. No.: 10/984,404

(22) Filed: Nov. 9, 2004

(51) Int. Cl.
*B60S 13/00* (2006.01)
(52) U.S. Cl. .................. 414/430; 280/79.4; 280/79.11
(58) Field of Classification Search ................ 414/426, 414/430; 104/44; 108/22; 180/199; 280/79.4, 280/11
See application file for complete search history.

(56) References Cited

U.S. PATENT DOCUMENTS

| | | | | |
|---|---|---|---|---|
| 772,014 | A | * 10/1904 | Weber | 414/430 |
| 806,599 | A | * 12/1905 | Thibault | 414/430 |
| RE12,430 | E | 1/1906 | Weber | |
| 863,122 | A | * 8/1907 | Weber | 414/430 |
| 878,135 | A | * 2/1908 | Hastings | 104/44 |
| 1,414,719 | A | * 5/1922 | Arndt | 104/41 |
| 2,552,804 | A | * 5/1951 | Morris | 414/430 |
| 2,610,750 | A | 9/1952 | Hulbert | |
| 3,285,447 | A | * 11/1966 | Junion | 414/469 |
| 4,350,470 | A | 9/1982 | Murillo | |
| 4,901,647 | A | 2/1990 | Drabing | |
| 5,161,932 | A | * 11/1992 | Johnson | 414/430 |
| 5,486,014 | A | 1/1996 | Hough | |
| 5,609,461 | A | 3/1997 | Lichtenberg | |
| 6,095,746 | A | * 8/2000 | Bergin | 414/430 |
| 6,287,069 | B1 | 9/2001 | Oliphant | |
| D520,708 | S | * 5/2006 | Allen | D34/28 |
| 2003/0215313 | A1 | * 11/2003 | Hinkle | 414/426 |

FOREIGN PATENT DOCUMENTS

| | | | |
|---|---|---|---|
| BE | 582081 | * | 11/1976 |
| GB | 2379644 A | * | 3/2003 |
| JP | 02120160 A | * | 5/1990 |
| JP | 11286262 A | * | 10/1999 |
| JP | 2000052941 A | * | 2/2000 |

\* cited by examiner

*Primary Examiner*—Saul Rodriguez
*Assistant Examiner*—Charles Greenhut
(74) *Attorney, Agent, or Firm*—Randal D. Homburg

(57) ABSTRACT

A motorcycle dolly which rolls upon a flat surface on four lower wheels positioned in a set radius on the flat surface, the dolly including an upper surface adapted to securely receive a rear wheel of a motorcycle while remaining stationary as the rear wheel of the motorcycle is rolled onto the upper surface, the dolly rolling along the flat surface in an arc equal to the set radius, the radius being the equivalent of the distance between the flat surface contact point of a front wheel and the contact point of the rear wheel, wherein the front wheel of the motorcycle remains stationary upon the flat surface, while the rear wheel upon the upper surface of the dolly is pivotal rotated along the radius, sliding the rear of the motorcycle along the flat surface for movement to a stored position.

4 Claims, 4 Drawing Sheets

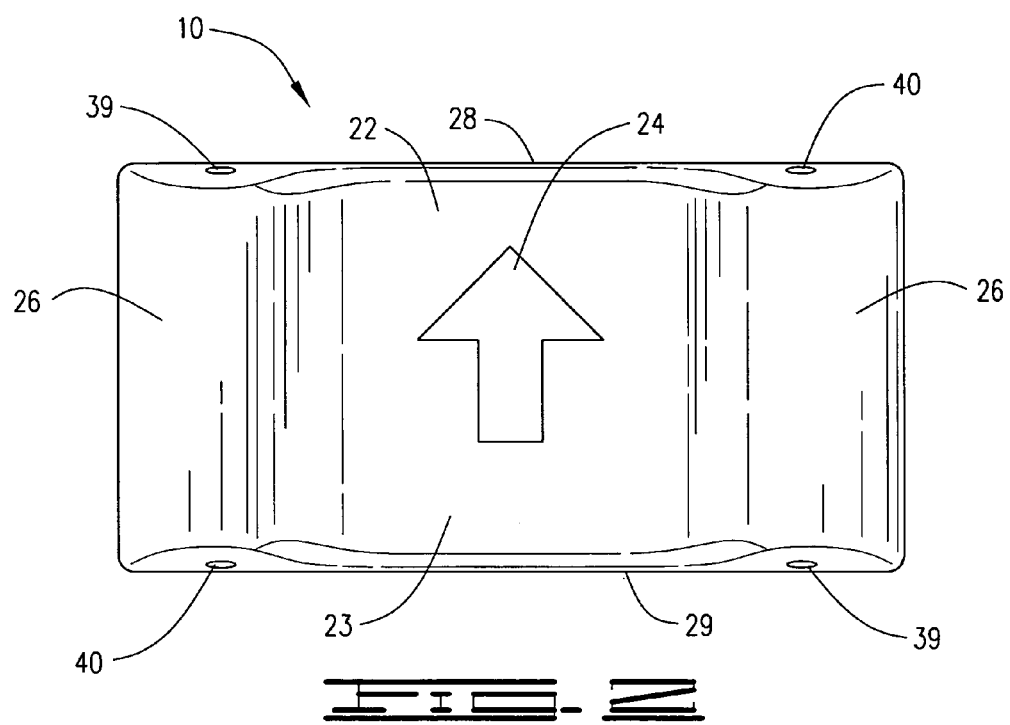
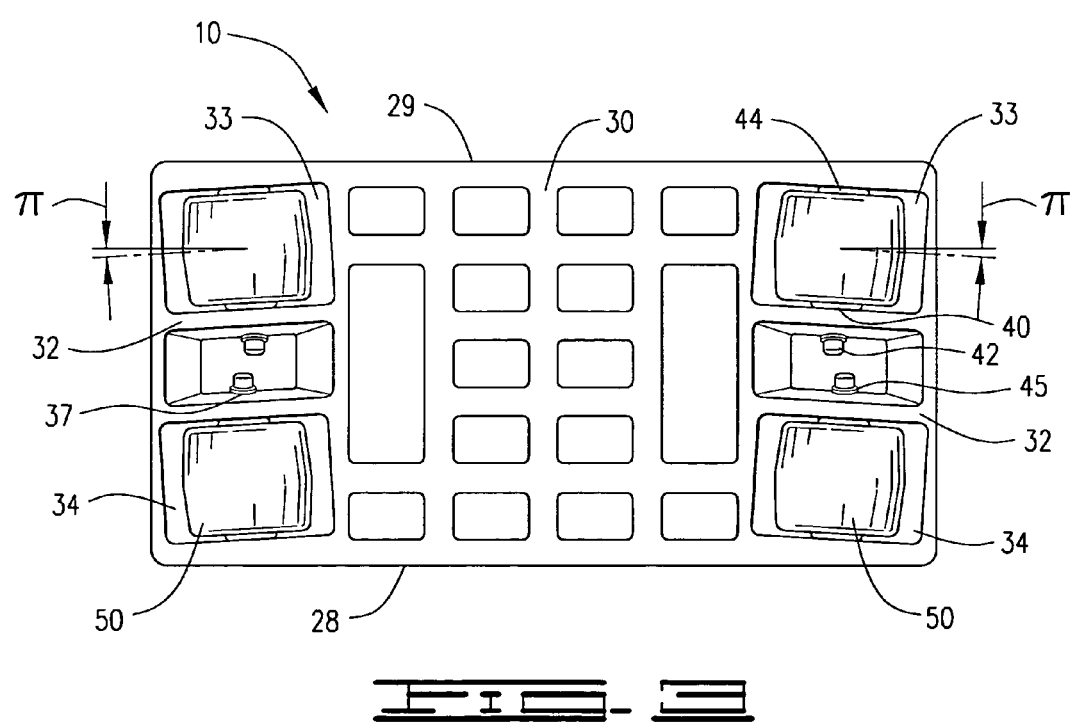

MOTORCYCLE SLIDER

CROSS REFERENCE TO RELATED APPLICATIONS

Design Patent Application No. 29/203,680 filed Apr. 17, 2004.

BACKGROUND OF THE INVENTION

1. Field of Invention

A motorcycle dolly which rolls upon a flat surface on four lower wheels positioned in a set radius on the flat surface, the dolly including an upper surface adapted to securely receive a rear wheel of a motorcycle while remaining stationary as the rear wheel of the motorcycle is rolled onto the upper surface, the dolly rolling along the flat surface in an arc equal to the set radius, the radius being the equivalent of the distance between the flat surface contact point of a front wheel and the contact point of the rear wheel, wherein the front wheel of the motorcycle remains stationary upon the flat surface, while the rear wheel upon the upper surface of the dolly is pivotal rotated along the radius, sliding the rear of the motorcycle along the flat surface for movement to a stored position.

2. Description of Prior Art

The following U.S. patents were discovered and are disclosed within this application for utility patent. All relate to motorcycle dollies or other scooter type devices.

A first set of patents disclose a dolly adapted to receive and move an entire motorcycle, all these dollies having omni-directional wheels which allow the dolly to be moved in any direction, but does not allow for the wheels themselves to be retained in a fixed position equal to the radius of the motorcycle, while remaining stationary during the motorcycle being loaded onto the dolly, except by locking devices on the wheels. Those patents include U.S. Pat. No. 6,287,069 to Oliphant, U.S. Pat. No. 5,609,461 to Lichtenberg, U.S. Pat. No. 5,486,014 to Hough and U.S. Pat. No. 4,901,647 to Drabing.

A set of dollies involved in a single patent is disclosed in U.S. Pat. No. 6,095,746 to Bergin, which includes a front dolly member having omni-directional wheels clamping to the front wheel of the motorcycle, a similar rear wheel dolly member, and a middle dolly member providing a kick stand retaining member.

Single wheel dollies are disclosed in U.S. Pat. No. 12,430 to Weber, U.S. Pat. No. 2,610,750 to Hulbert and U.S. Pat. No. 4,350,470 to Murillo. Weber is a truck having either two pairs of casters or bolsters which are omni-directional, drop frame bars connecting the casters or bolsters, a load supporting platform and a pivotal skid. Hulbert is a nearly identical device, except it has a block opposite the pivotal ramp or skid. Murillo is a three wheeled version of Hulbert, except it has a pivotal block and a pivotal ramp or skid, with two fixed front wheels and an omni-direction rear wheel attached underneath the pivotal block, the ramp causing the block to raise as the flat tire is loaded onto the platform.

None of the above disclosed patents include a unified solid frame platform, four fixed wheels fixed at an angle to allow for the platform to be rotated in an arc equal to the pivot radius of the motorcycle, the wheels preventing movement along the line of loading of the rear wheel of the motorcycle.

SUMMARY OF THE INVENTION

One of the primary problems encountered in owning a motorcycle is storage of the motorcycle in a covered and protected area. Motorcycle owners often select an area in their garage in which to store their motorcycle. Additionally, most motorcycle owner's garages have many other items in their garage, making the maneuvering of the motorcycle within the confines of the designated space difficult, unless other times are moved out of the way, or the owner is able, somehow, to move the motorcycle sideways, as well as front to back. It is easier to move the front of the motorcycle to a specific location than it is to move the rear portion of the motorcycle, because the rear portion cannot be turned or steered. It would be easier to position the motorcycle if one could move just the rear of the bike sideways, while leaving the front of the motorcycle in position to pivot.

In the prior art, nearly all of the motorcycle dollies located disclose a dolly for either both motorcycle wheels or the rear motorcycle wheel, which allow for the omni-directional movement of the motorcycle. This would accomplish a portion of the objectives of the present invention, which would be to allow for movement of the motorcycle in any direction. The problem with these dollies is that they are difficult to immobilize for loading the motorcycle without having to manually lock the wheels and the dolly in place as the motorcycle is loaded upon the dolly, because of the dolly being capable of front to back movement in the direction of the loading as well as side to side movement or any combination for that matter. The present dolly eliminates this loading problem by eliminating any front to back movement of the dolly during loading by using at least four fixed wheels.

The present dolly does not move in the loading direction and remains stationary during the loading process without having to manually lock the wheels in place. The motorcycle owner simply places the dolly in front or behind the rear wheel and rolls the motorcycle onto the upper surface of the dolly with an arrow on the upper surface indicating the front wheel. The dolly cannot be moved forward or backward in the direction of the loading of the motorcycle. The four wheels are locked into a fixed position which is slightly angled from a direction guiding the wheels in a direction perpendicular to the loading direction of the motorcycle. The angle of the wheels is directly related to the pivot radius of the motorcycle when the front wheel is planted and the rear wheel is pivoted in an arc, the angle direction the dolly in such arc of the pivot radius as defined. Distinguished from the omni-directional wheels, the present dolly is loaded without having to manually lock the dolly wheels and pivot only in an arc as directed by the fixed position of the wheels.

The primary objective of the motorcycle dolly is to provide a motorcycle dolly which allows for the rear wheel of a motorcycle to move side to side in an arc consistent with the pivot radius of a motorcycle. A secondary objective of the motorcycle dolly is to allow for the loading of a rear wheel of a motorcycle onto the dolly without having to manually restrain or lock the wheels of the motorcycle dolly to prevent front to back movement in the loading direction.

DESCRIPTION OF THE DRAWINGS

The following drawings are submitted with this utility patent application.

FIG. 2 is a top view of the dolly.

FIG. 3 is a bottom view of the dolly.

FIG. 6 is a view of the dolly indicating the relationship of the dolly to the pivot arc and pivot radius of the front and rear wheels of the motorcycle.

DESCRIPTION OF THE PREFERRED EMBODIMENT

Figure 1:
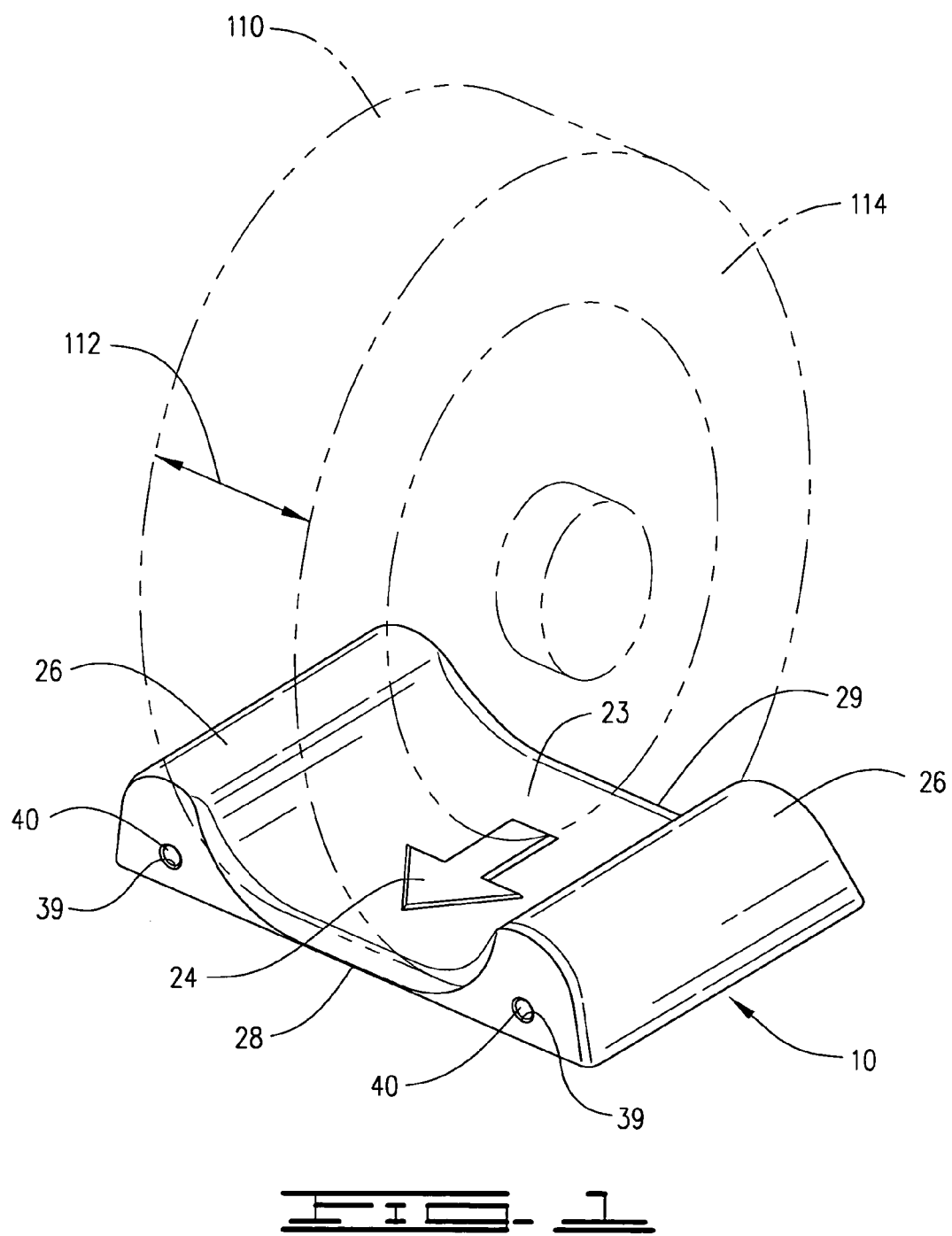
FIG. 1 is an upper front perspective view of the motorcycle dolly

A motorcycle dolly 10, shown in FIGS. 1-6 of the drawings, adapted to be placed under a rear wheel 110 of a motorcycle allowing a heavier rear portion of the motorcycle upon the dolly 10 to be moved laterally in a pivotal arc α equal to a pivot radius β of the motorcycle, comprises a dolly platform 20 having an upper surface 22 defining a wheel groove 23 adapted to the width 112 of the rear wheel 110 of the motorcycle and two elevated lateral wheel well margins 26, the platform 20 also providing a lower surface 30 defining two recessed wheel well cavities 32, each recessed wheel well cavity 32 including two fixed wheels 50 retained within each wheel well cavity 32 by an axle 40, the axle 40 and wheels 50 positioned at a fixed pivot angle π within the wheel well cavity 32 the fixed wheels 50 directing travel of the dolly 10 in the pivotal arc α equal to the pivot radius β of the motorcycle, the pivot radius β defined as the distance θ between the rear wheel 110 of the motorcycle and a front wheel 100 of the motorcycle, FIG. 6.

Figure 4:
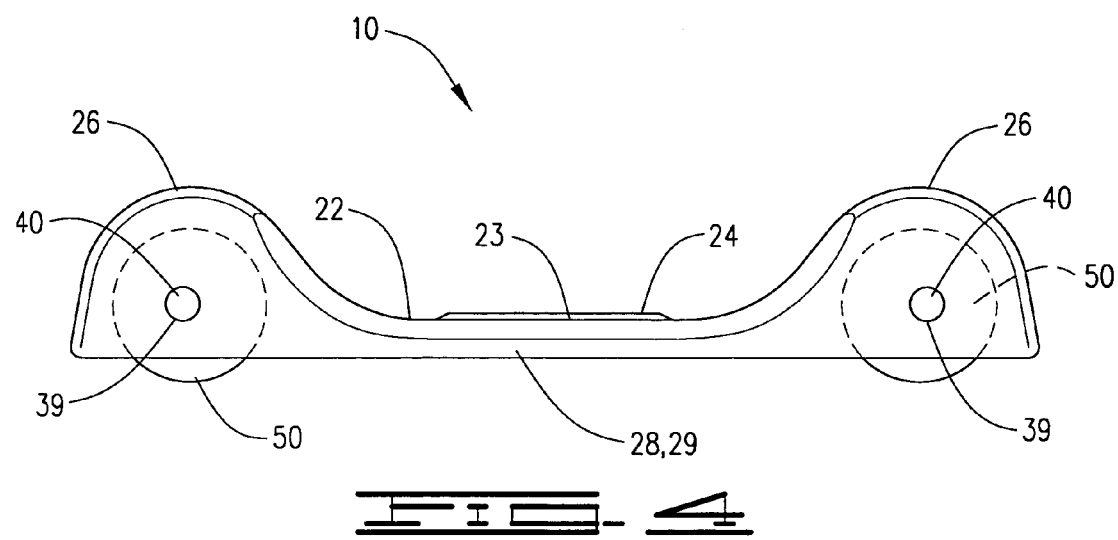
FIG. 4 is a side profile view of the dolly.
Figure 5:
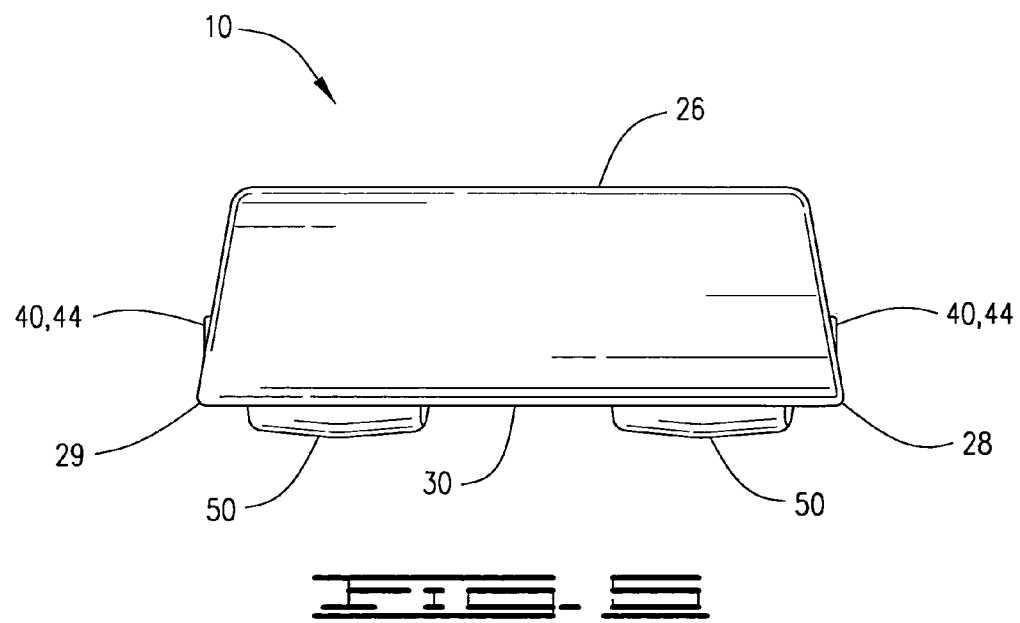
FIG. 5 is an end profile view of the dolly.
Figure 5:
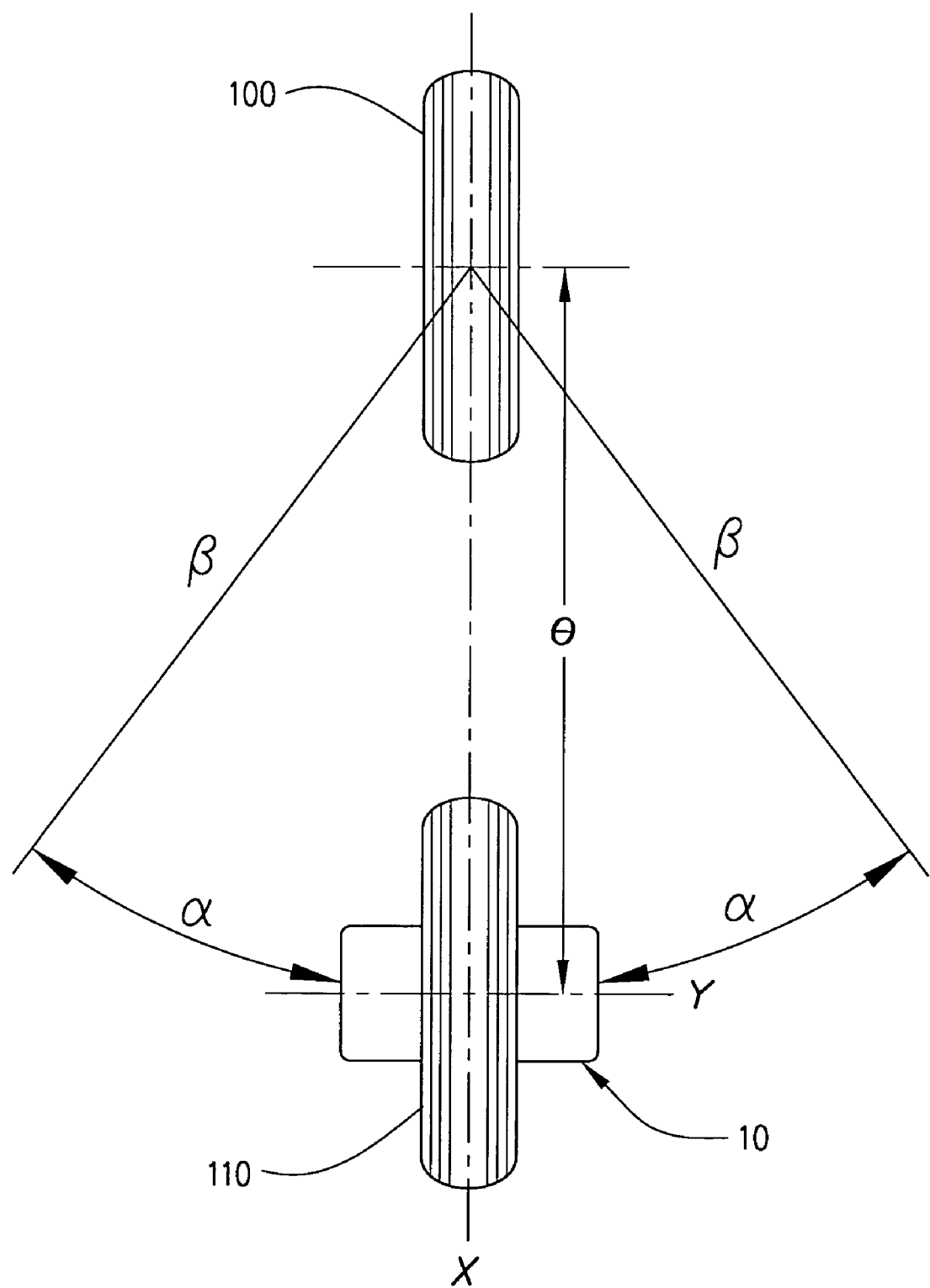

As further defined, the dolly platform 20 is preferably a single unitized component having a tapered front edge 28 and a tapered rear edge 29 between each elevated lateral wheel well margin 26, as shown in FIGS. 1-2 and 4 of the drawings. The wheel groove 23 may be provided with an arrow 24 pointing to the front edge 28 of the dolly, also indicative of the loading direction for the rear wheel 110 of the motorcycle. Each elevated lateral wheel well margin 26 is set apart from the other adapted to the width 112 of the rear wheel 110 of the motorcycle, the elevated wheel well margins 32 having an inner surface 27 partially engaging the sides 114 of the rear wheel 110 of the motorcycle, FIG. 1.

The lower surface 30, FIG. 3, is further defined as including the recessed wheel well cavities 32 being formed within each of the elevated lateral wheel well margins 26, each recessed wheel well cavity 32 having a front wheel compartment 33, a rear wheel compartment 34 and an axle extension compartment 35 between the front and rear wheel compartments, 33, 34. These front and rear wheel well compartments 33, 34 are preferable set at the same fixed pivot angle π as the axle 40 and wheels 50. The each wheel 50 is suspended within each respective front or rear wheel well compartment 33, 34 by the axle 40, which is further held within each respective wheel well compartment 33, 34 by an inner axle bore 37 between the axle extension compartment 35 and the respective wheel well compartment 33, 34 at an inner end 42, FIG. 3, and an outer axle bore 39 between the respective wheel well compartment 33, 34 and the front edge 28 or rear edge 29 of the elevated lateral wheel well margin 26, as indicated in FIGS. 1, 2 and 4, at an outer end 44. A retaining means 45 is applied to each outer end 44 and inner end 42 of the axle 40 to retain the axles 40 within the inner and outer axle bores 37, 39.

The fixed pivot angle π of the wheels 50 is determined by the pivot radius β of the motorcycle. As different motorcycles have different distances θ between the front wheel 100 and rear wheel 110 and therefore different pivot radii β, the fixed pivot angle π may vary slightly between the different motorcycles, requiring the fixed pivot radius β of the dolly 10 to be adapted to the motorcycle for which it is intended to be used. This allows for the rear wheel 110 of the motorcycle to be moved along the pivotal arc α while the front wheel 100 of the motorcycle remains still.

FIG. 6 graphically demonstrates the relationship between the pivot radius β, the pivotal arc α, the distance θ between the front and rear wheels 100, 110 and an x axis, which is the line of the front and rear wheels 100, 110, and a y axis, which is perpendicular to the x axis, intersecting below the center of the rear wheel 110. The y axis is tangent to the pivotal arc α and the pivot radius β is equal to the distance θ between the front and rear wheels and the pivot radius β and the distance θ are the same measurement.

The preferred embodiment of the motorcycle dolly 10 is as shown in FIGS. 1-6, although any aesthetic dimension and shape of the platform 20 is contemplated within the scope of this motorcycle dolly 10, as long as the elements preform the same functional applications. The platform 20 is preferably made from a sturdy metal or heavy duty plastic material and is best provided as a unitized cast component. The axles 40 are preferably a heavy capacity rolled steel rod and the retaining means 45 may be provided as a retaining cap FIG. 3, applied to each inner and outer end 42, 44, a retaining washer attaching within a retaining groove on each inner and outer end, or other means to prevent disengagement of the axle 40 from the wheel well compartment 33, 34. The wheels 50 may be made of plastic, metal, rubber or ceramic allowing the wheels 50 to roll freely upon a flat surface.

While the motorcycle dolly 10 has been particularly shown and described with reference to a preferred embodiment thereof, it will be understood by those skilled in the art that changes in form and detail may be made therein without departing from the spirit and scope of the invention.

What is claimed is:

1. A motorcycle dolly adapted to a rear wheel of a motorcycle allowing the rear wheel to be placed upon the dolly to be moved laterally in a pivotal arc having a radius equal to a distance between a front wheel and said rear wheel of said motorcycle, comprises:

a dolly platform having an upper surface defining a wheel groove adapted to receive said rear wheel and two elevated wheel well margins spaced laterally on said platform, said platform also providing a lower surface defining two recessed wheel well cavities; and a front and rear wheel retained within each wheel well cavity by a respective front and rear axle, wherein the longitudinal axis of said front axle is non-colinear with the longitudinal axis of said rear axle, said axles and wheels positioned at a fixed pivot angle within said wheel well cavity forcing said wheels to direct travel of said dolly in said pivotal arc.

2. The dolly, as disclosed in claim 1, said dolly platform further comprising:

a tapered front edge and a tapered rear edge between each said elevated wheel well margin, each said elevated wheel well margin set apart from the other at a distance adapted to partially engage said rear wheel, said elevated wheel well margins having an inner surface adapted form partially engaging sides of said rear wheel of said motorcycle.

3. The dolly, as disclosed in claim 1, wherein said recessed wheel well cavities are formed within each said elevated wheel well margin, each said recessed wheel well cavity having a front wheel compartment, a rear wheel compartment and an axle extension compartment between the front and rear wheel compartments, said wheel well compartments provided at the same fixed pivot angle as the axles and wheels;

each said wheel is suspended within each front and rear wheel well compartment by each axle, each axle further held within each said wheel well compartment by an inner axle bore between said axis extension compartment and said respective front or rear wheel well compartment at an inner end, and an outer axle bore between said respective wheel well compartment and a respective front edge or a rear edge of said elevate wheel well margin at an outer end; and a retaining means applied to each said outer end and inner end of said axle to hold said axles within said inner and outer axle bores.

4. A motorcycle dolly adapted to a rear wheel of a motorcycle allowing the rear wheel of the motorcycle to be placed upon the dolly to be moved laterally in a pivotal arc having a radius equal to a distance between a front wheel and said rear wheel of said motorcycle, comprises:

a dolly platform having an upper surface defining a wheel groove adapted to receive said rear wheel and two elevated wheel well margins spaced laterally on said platform, a tapered front edge and a tapered rear edge between each said elevated wheel well margin, each said elevated lateral wheel well margin set apart from said other at a distance adapted to said width of said rear wheel, said elevated wheel well margins having an inner surface adapted for partially engaging sides of said rear wheel, said platform having a lower surface defining two recessed wheel well cavities and a front and rear wheel retained within each wheel well cavity by a respective front and rear axle, wherein the longitudinal axis of said front axle is non-colinear with the longitudinal axis of said rear axle, said axles and wheels positioned at a fixed pivot angle within said wheel well cavity forcing said wheels to direct travel of said dolly in said pivotal arc, said recessed wheel well cavities formed within each said elevated lateral wheel well margins, each said recessed wheel well cavity having a front wheel compartment, a rear wheel compartment and an axle extension compartment between said front and rear wheel compartments, said wheel well compartments provided at said same fixed pivot angle as said axles and wheels, each said wheel suspended within each front and rear wheel well compartment by said axle, said axle further held within each said wheel well compartment by an inner axle bore between said axle extension compartment and said respective front or rear wheel well compartment at an inner end, and an outer axle bore between said respective wheel well compartment and respective a front edge or a rear edge of said elevated lateral wheel well margin at an outer end, and a retaining means applied to each said outer end and inner end of said axle to hold said axles within said inner and outer axle bores.

* * * * *